(12) United States Patent
Sattler et al.

(10) Patent No.: US 6,729,871 B2
(45) Date of Patent: May 4, 2004

(54) INJECTION MOULDING DEVICE HAVING A COOLED VALVE PIN GUIDE BUSH

(75) Inventors: Peter Sattler, Zwingenberg (DE); Udo Liebram, Pfungstadt (DE)

(73) Assignee: Synventive Molding Solutions B.V., s'Gravendeel (NL)

( * ) Notice: Subject to any disclaimer, the term of this patent is extended or adjusted under 35 U.S.C. 154(b) by 0 days.

(21) Appl. No.: 10/041,629

(22) Filed: Jan. 10, 2002

(65) Prior Publication Data

US 2002/0106419 A1 Aug. 8, 2002

(30) Foreign Application Priority Data

Jan. 10, 2001 (EP) ............................................. 01200058

(51) Int. Cl.$^7$ .............................................. B29C 45/23
(52) U.S. Cl. ....................................... 425/564; 425/566
(58) Field of Search .................................. 425/562, 563, 425/565, 564, 566

(56) References Cited

U.S. PATENT DOCUMENTS

| 4,729,733 A | 3/1988 | Schmidt |
| 4,747,770 A | 5/1988 | Schmidt |

FOREIGN PATENT DOCUMENTS

| EP | 0 920 970 A1 | 6/1999 |
| JP | A 7-100863 | 4/1995 |

*Primary Examiner*—Tim Heitbrink
(74) *Attorney, Agent, or Firm*—Young & Thompson

(57) ABSTRACT

The invention relates to an injection molding device (1) having an elongated nozzle (3) and a valve pin (11) coaxially in a channel of the nozzle. The valve pin can be displaced by means of an actuating cylinder (15) and is guided through a bush (13) at the upper end (12) of the nozzle. Cooling means (14, 18) are associated with said bush (13).

20 Claims, 4 Drawing Sheets

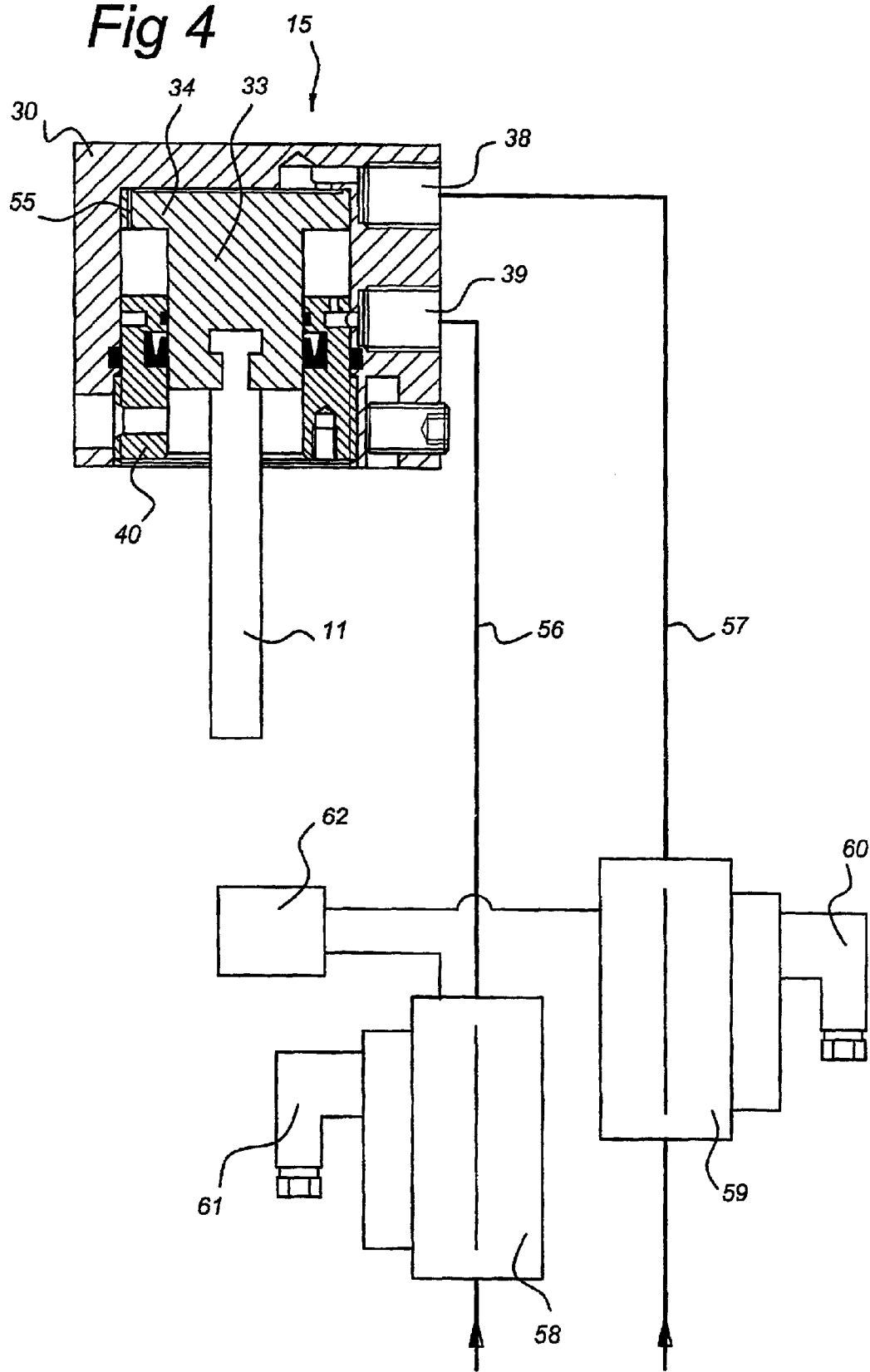

INJECTION MOULDING DEVICE HAVING A COOLED VALVE PIN GUIDE BUSH

BACKGROUND OF THE INVENTION

The invention relates to an injection moulding device comprising a mould body having a cavity, an elongated nozzle seated in the cavity, a valve pin coaxially in a channel of the nozzle and actuating means connected to the valve pin for axially displacing the valve pin in the nozzle, the valve pin exiting the channel via a bore at the upper end of the nozzle and being guided by a bush in said bore.

DETAILED DESCRIPTION OF THE RELATED ART

A valve gated injection moulding device of the above-mentioned type is known from EP-A-0 836 925 in the name of the applicant. By axial displacement of the valve pin, the gate of the nozzle is opened and closed to control the flow of molten thermoplastic material into a mould cavity. The valve pin head projects via a bore in the manifold body from the upper part of the nozzle and is seated in a sliding bush, which is axially displaced by means of a lever arm. The lever arm is connected to a hydraulic cylinder that is placed at a radially offset location from the valve pin. Leakage of molten thermoplastic material along the bore in the manifold body is prevented by a relatively long bore and by a narrow gap between the wall of the bore and the needle, wherein a gap width of less than 20 micrometers is required. Such narrow gaps are difficult to manufacture and may cause metal-to-metal wear (fretting, corrosion) of the needle against the bush.

SUMMARY OF THE INVENTION

It is an object of the present invention to provide a valve gated injection moulding device, having a valve pin which can be guided in a bush without leakage, and without the risk of prohibitive wear.

Hereto the injection moulding device according to the invention is characterized in that cooling means are associated with said bush.

By providing a cooled bush, the viscosity of the molten thermoplastic material in the gap between the needle and the bush may be increased. Hence, leakage may be prevented, even if the gap width is relatively large. Furthermore, the solidified thermoplastic material forms a lubricating material between the bush and the valve pin, such that wear of the needle is prevented.

In a preferred embodiment, the bush projects above a surface of the mould body, the cooling means comprising a cooling plate, spaced away from the mould body, and associated with the upper end of the bush. The cooling plate may form the base on which the actuating cylinder of the valve pin is placed, to provide a thermal insulation, such that the seals and the pressure medium of the cylinder are not exposed to the high temperatures of the manifold. In this way a very compact and leakage free actuating mechanism of the valve pin is obtained. The cooling plate may be supported on the manifold via a refractive spacer member. The bush may be seated in a cavity in the mould body at a distance from the sidewalls of the cavity, the bush having a lower shoulder, a clamping ring being screwed into the cavity and engages with the shoulder on the bush, an inner wall of the clamping ring being spaced away from the sidewall of the bush. In this way, heat transfer from the heated manifold, which may have a temperature of for instance 350° C. to the cool cylinder is via the bush minimised. Hereby the internal seals of the cylinder are not exposed to high temperatures, such that the service life of the seals is increased.

BRIEF DESCRIPTION OF THE DRAWINGS

An embodiment of an injection moulding device according to the present invention will, by way of example, be described in detail with reference to the accompanying drawing. In the drawing:

FIG. 4 shows an end position indicator for the cylinder, comprising a flow meter in the hydraulic ducts.

DESCRIPTION OF THE PREFERRED EMBODIMENTS

Figure 1:
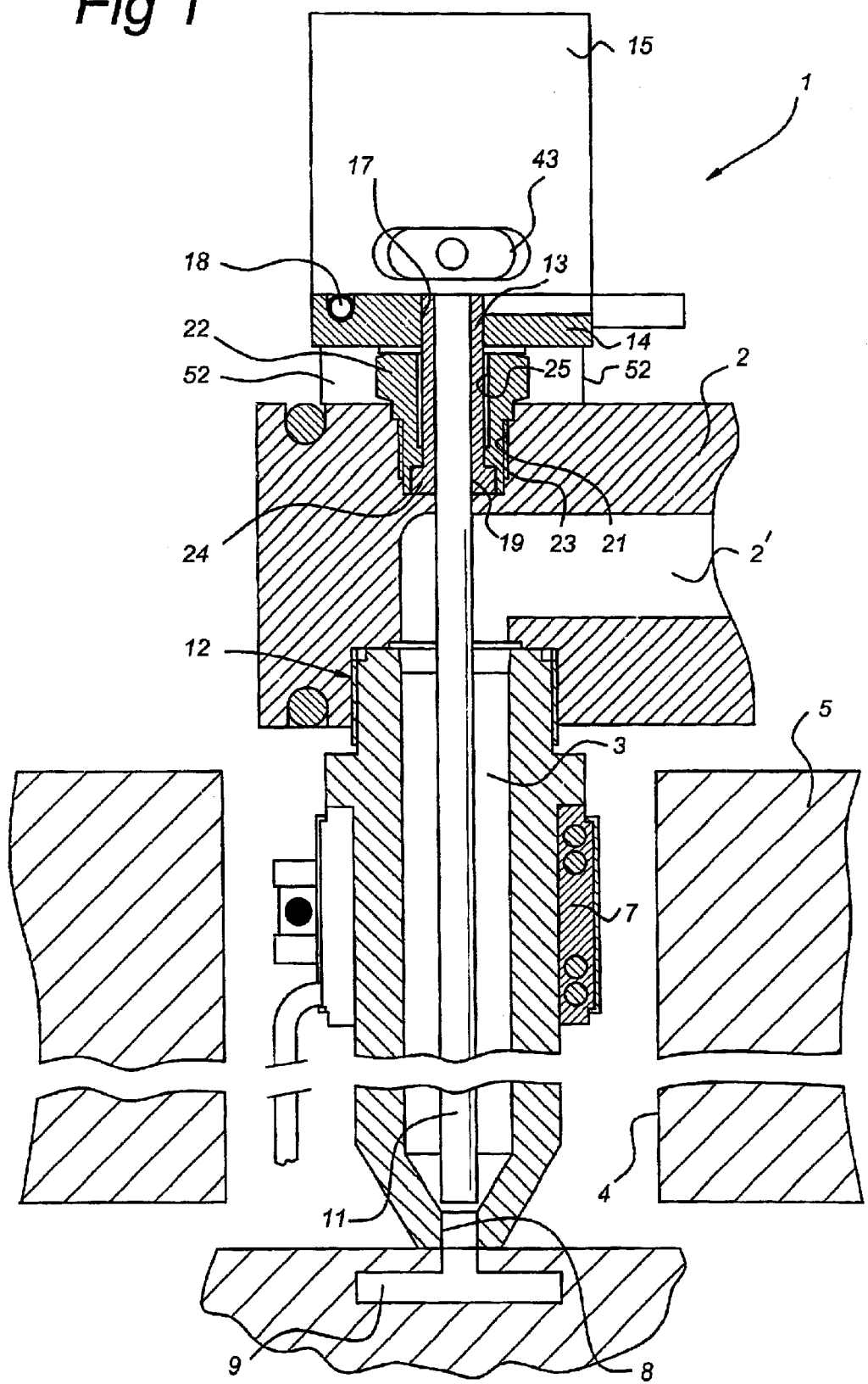
FIG. 1 shows a cross-sectional view of an in injection moulding device according to the invention.

FIG. 1 shows an injection moulding device 1, comprising a manifold 2 having a transverse duct 2 for supplying molten thermoplastic material to a vertical nozzle, or hot runner 3. In the manifold 2, the thermoplastic material is supplied at a temperature which may amount to over 350° C. at a pressure of for instance 200 bar. The nozzle 3 is connected to the manifold 2 and is seated in a well 4 of the mould body 5. The nozzle 3 is separated from the mould body 5, which may have a temperature of for instance 40° C. by an air gap, surrounding the nozzle 3. The nozzle 3 is surrounded by a heating element 7, to keep the temperature of the thermoplastic material above the melting point. The molten thermoplastic material exits the nozzle 3 via a gate 8 to enter into a mould cavity 9. The gate 8 is opened and closed by a valve pin 11, which can slide up and down in the nozzle 3. The valve pin 11 exits at the upper end 12 of the nozzle 3, a bore in the manifold 2, and is guided by a bush 13. The valve pin passes through a cooling plate 14 and is attached to a hydraulic cylinder 15 that is located in line with the valve pin 11. The bush 13 is clampingly pressed into a central bore 17 of the cooling plate, or is connected via a sliding fitment to be in good heat conducting contact with the cooling plate 14. The cooling plate 14 comprises a generally circular cooling channel 18, in which a cooling medium, such as water, is circulated. The relatively cool bush 13 is seated in a cavity 21 in the manifold 2 and is only supported with a relatively small surface area of the end part 19 onto the hot manifold 2, such that heat transfer from the manifold to the bush 13, and hence to the cylinder 15, is minimised.

The bush 13 is connected to the manifold 2 by a clamping ring 22, which is screwed into the cavity 21.

The clamping ring 22 comprises a shoulder 23 that engages a shoulder 24 of the bush 13. The inner sidewall 25 of the clamping ring 22 is spaced from the bush 13, such that an insulative air gap is formed between the bush and the clamping ring. By using a relatively long bush 13, which is connected to the cooling plate 14, the viscosity of the molten thermoplastic material at the position of the bush 13 is increased. Hereby leakage of molten thermoplastic material from the manifold 2 can be prevented, even at a relatively large play of the bush 13 around the valve pin 11, such as 20 micrometer or more. Furthermore, the (partly) solidified thermoplastic material in the gap between the bush 13 and the valve pin 11 has a lubricating effect, so that metal-to-metal wear of the valve pin 11 against the metal bush material is prevented.

Figure 2:
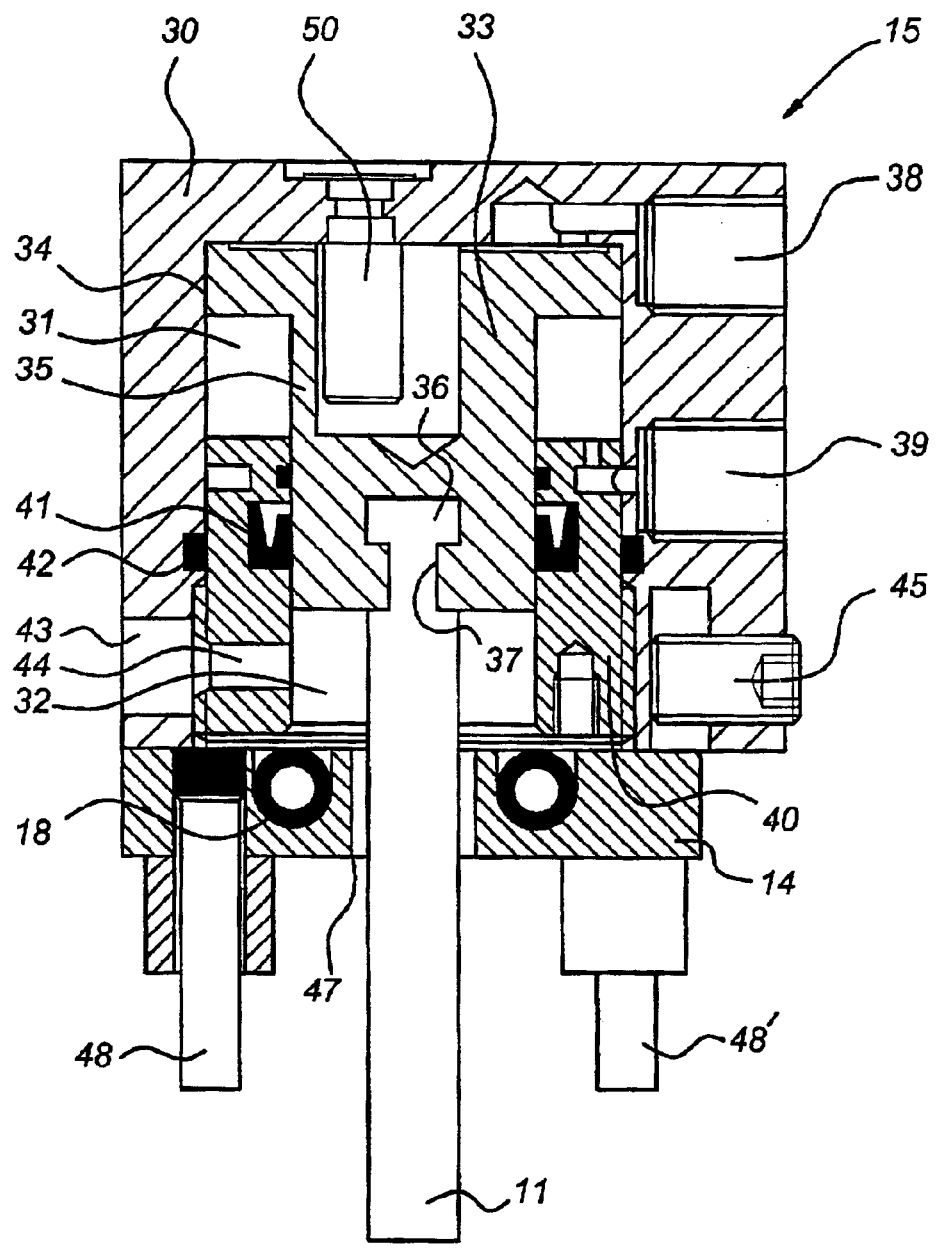
FIG. 2 shows a cross-sectional view of the actuating cylinder of the injection moulding device of FIG. 1.

FIG. 2 shows a cross-sectional view of the cylinder 15, including a cylinder housing 30 in which a piston 33 can be displaced between an upper chamber part 31 and a lower chamber part 32. The piston 33 comprises a piston head 34 and a stem 35. The stem 35 comprises a T-shaped recess 36 in which the valve pin head 37 is seated in a rotationally fixed orientation.

The cylinder housing 30 comprises two bores 38,39, one on either side of the piston head 34, connected to fluid ducts. The stem 35 of the piston 33 is seated in a bore of a height adjustment ring 40, which is screwed into the lower part 32 of the cylinder housing 30. By axially displacing the ring 40 within the housing 30, the stroke of the piston 33 can be varied within a range of several mm. Flexible seals 41, 42, for instance made of PTFE, prevent leakage of the hydraulic oil from the chamber 31. The height adjustment ring 40 can be accessed via an elongated slot 43 in the cylinder housing 30, through which a tool can be inserted into several recesses 44 in the circumferential wall of the height adjustment ring 40, in order to rotate the ring. The ring 40 is locked at its proper height via a locking bolt 45.

The valve pin 11 enters through a central bore 47 in the cooling plate 14 into the cylinder housing 30, which is releasably connected to the cooling plate 14, which in turn is connected to the manifolds via two locating pins 48 and two bolts 48'.

The piston 33 can slide axially within the housing 30 along a locator pin 50, which maintains the piston in its desired angular orientation. The walls of the piston head 34 form a non-liquid tight connection with the inner wall of the cylinder housing, so that some hydraulic oil may leak from the high pressure side of the piston head 34 to the low pressure side, when the piston is not in either its upper or its lower end position. Hereby degradation of the hydraulic oil is prevented, and an automatic venting for removal of air from the cylinder 15 is achieved. Furthermore, the small oil flow from the high pressure side to the low pressure side of the piston head 34, which occurs while the piston is travelling from one end position to the other end position, can be used to obtain an indication of the piston position. By placing the cylinder 15 onto the manifold 2, via the cooling plate 14, the seals 41,42 are protected from the high temperatures of the manifold. The construction of the cylinder 15 is very compact, and can easily be accommodated in the limited space available in injection moulding systems, in which a small distance between several nozzles is desired.

Figure 3:
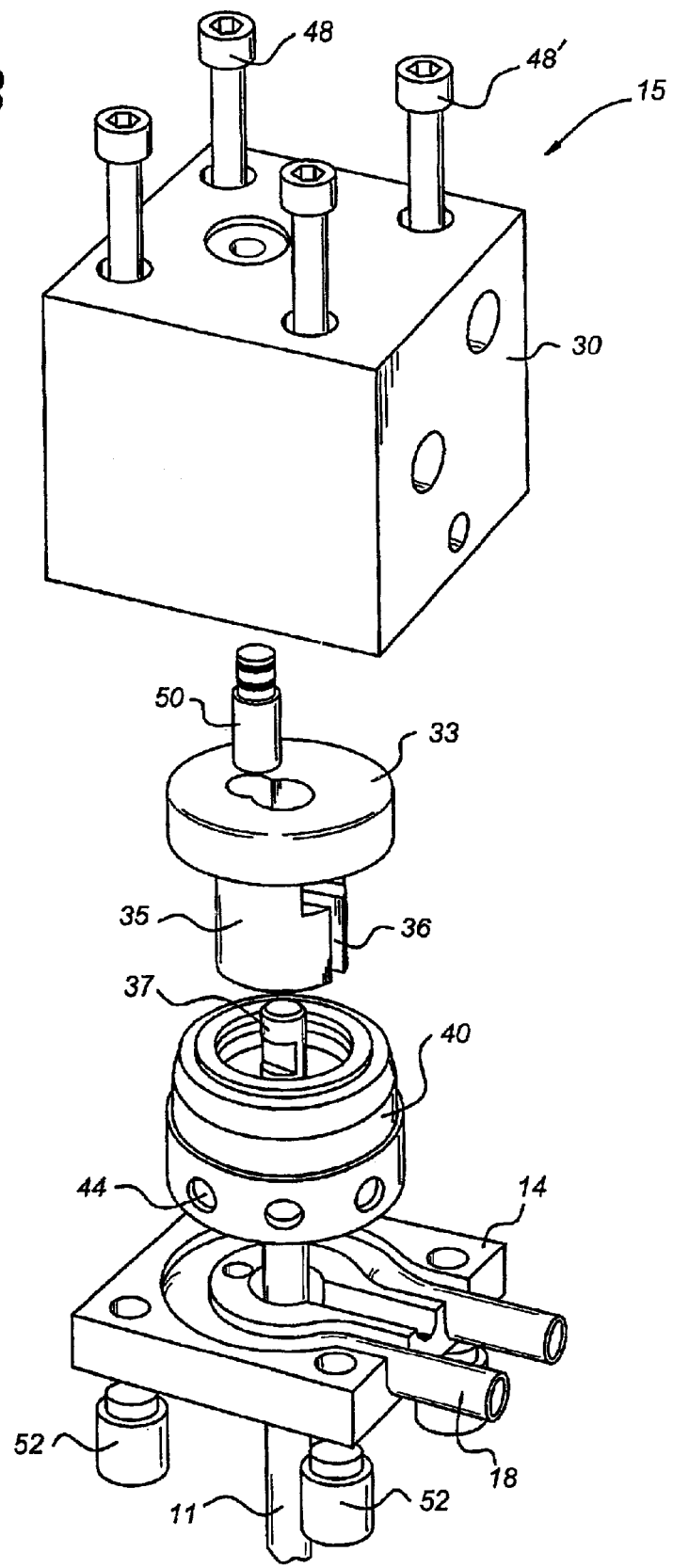
FIG. 3 shows an exploded view of the cylinder of FIG. 2.

As can be seen from FIG. 3, the cylinder housing 30 can be easily detached from the cooling plate 14 by two locating pins 48 and tow bolts 48', which project through refractive spacer members 52 via which the cooling plate 14 is supported on the manifold. After detaching the housing 30, the piston 33 can be lifted from the height adjustment ring 40. Next, the piston is moved parallel to the cooling plate 14, such that the valve pin head exits the T-shaped axial slot 36 in the piston stem 35, in the radial direction. Instead of a T-shaped slot in the piston stem 35, the valve pin head may be seated in a groove in the stem 35 and be connected by pins or bolts. In this way, the cylinder 15 can be disconnected from the valve pin 11 without removal of the valve pin 11 from the nozzle 3. Because the valve pin can remain seated within the nozzle, no cleaning of the valve pin/slide bush is required which would be the case if the valve pin were to be removed from the nozzle. Furthermore, removal of the valve pin from the nozzle would require heating of the nozzle prior to removal, which is not necessary for the valve pin connection, according to the present invention.

As can be seen in FIG. 4, the piston head 34 of the piston 33 comprises a bore 55, via which hydraulic oil can pass when the piston head is not engaged with the cylinder housing 30 in its upper end position or with the height adjustment ring 40 in its lower end position. In the end positions of the piston, the bore 55 is blocked such that no oil can pass through. In the hydraulic ducts 56,57, a flow meter 58,59 is comprised, generating a displacement signal, indicating when the piston is not in one of its end positions. The displacement signals can be transmitted to a processing and/or display device 62 for indicating the end position of the valve pin 11. The processing device 62 can be used for automatic control of several valve pins in the injection moulding apparatus, for instance for sequentially filling a larger mould cavity from several nozzles. The flow meters 58, 59 as well as the processing/display device 62 can be placed outside the high temperature area of the injection moulding device. When the height adjustment ring 40 is moved to vary the stroke of the piston 33, the stopping surface of the ring 40 closing off the bore 55 is moved, such that the end position of the valve pin is indicated properly at all times. Existing injection moulding apparatus having a hydraulically or pneumatically driven valve pin can be provided with a position indicator according to the present invention in a simple manner by providing a bore 55 in the piston 33, and incorporating flow meters 58,59 in the ducts 56,57.

What is claimed is:

1. Injection moulding device (1) comprising a mould body (2, 5) having a cavity (4), an elongated nozzle (3) seated in the cavity (4), a valve pin (11) coaxially in a channel of the nozzle and actuating means (15) connected to the valve pin for axially displacing the valve pin in the nozzle, the valve pin exiting the channel via a bore at the upper end (12) of the nozzle and being guided by a bush (13) in said bore, characterized in that cooling means (14, 18) are associated with said bush (13),
   wherein the bush (13) projects above a surface of the mould body (2), the cooling means comprising a cooling plate (14), spaced away from the mould body, and associated with the upper end of the bush (13), and
   wherein the cooling plate (14) is supported on the mould body via a refractive spacer member (52).

2. Injection moulding device (1) comprising a mould body (2, 5) having a cavity (4), an elongated nozzle (3) seated in the cavity (4), a valve pin (11) coaxially in a channel of the nozzle and actuating means (15) connected to the valve pin for axially displacing the valve pin in the nozzle, the valve pin exiting the channel via a bore at the upper end (12) of the nozzle and being guided by a bush (13) in said bore, characterized in that cooling means (14, 18) are associated with said bush (13),
   the bush being seated in a cavity (21) in the mould body (2) at a distance from the sidewalls of the cavity (21), the bush having a lower shoulder (24), a clamping ring (22) being screwed into the cavity (21) and engaging with the shoulder (22) on the bush, an inner wall (25) of the clamping ring (22) being spaced away from the sidewall of the bush (13).

3. Injection moulding device (1) according to claim 1, wherein the actuator means (15) comprises a cylinder (15) that is placed above the valve pin (11), coaxial therewith, a cylinder housing (30) being detachably coupled to a cooling plate (14) having a cooling channel (18) located below the cylinder (15) and said cooling plate having a bore (47) accommodating the upper end of the bush (13).

4. Manifold unit (2) for use in an injection moulding device according to claim 1, comprising a central channel, a branching channel (21) with the elongated nozzle (3) connected to the branching channel, the cooling plate (14) being supported on the manifold body (2) via a refractive spacer member (52), a cylinder being placed above the valve pin (11), coaxial therewith, the cylinder housing (30) being coupled to the cooling plate, the cooling plate (14) comprising a cooling channel (18) located below the cylinder (15) and said cooling plate having a bore (47) accommodating the upper end of the bush (13).

5. Injection moulding device (1) comprising a mould body (2, 5) having a cavity (4), an elongated nozzle (3) seated in the cavity (4), a valve pin (11) coaxially in a channel of the nozzle and actuating means (15) connected to the valve pin for axially displacing the valve pin in the nozzle, the valve pin exiting the channel via a bore at the upper end (12) of the nozzle and being guided by a bush (13) in said bore, wherein the bush (13) passes through the cooling means (14, 18) and the cooling means (14, 18) engage around the bush (13).

6. Injection moulding device (1) according to claim 5, wherein,
the bush (13) projects above a surface of the mould body (2), and
the cooling means comprises a cooling plate (14), spaced away from the mould body, and associated with the upper end of the bush (13).

7. Injection moulding device (1) according to claim 6, wherein the cooling plate (14) forms a base plate on which the actuating means (15) are placed.

8. Injection moulding device according to claim 6, wherein the cooling plate (14) is supported on the mould body via a refractive spacer member (52).

9. Injection moulding device according to claim 5, wherein the cooling plate (14) is supported on the mould body via a refractive spacer member (52).

10. Injection moulding device (1) according to claim 5, the bush being seated in a cavity (21) in the mould body (2) at a distance from the sidewalls of the cavity (21), the bush having a lower shoulder (24), a clamping ring (22) being screwed into the cavity (21) and engaging with the shoulder (22) on the bush, an inner wall (25) of the clamping ring (22) being spaced away from the sidewall of the bush (13).

11. Injection moulding device (1) according to claim 6, the bush being seated in a cavity (21) in the mould body (2) at a distance from the sidewalls of the cavity (21), the bush having a lower shoulder (24), a clamping ring (22) being screwed into the cavity (21) and engaging with the shoulder (22) on the bush, an inner wall (25) of the clamping ring (22) being spaced away from the sidewall of the bush (13).

12. Injection moulding device (1) according to claim 7, the bush being seated in a cavity (21) in the mould body (2) at a distance from the sidewalls of the cavity (21), the bush having a lower shoulder (24), a clamping ring (22) being screwed into the cavity (21) and engaging with the shoulder (22) on the bush, an inner wall (25) of the clamping ring (22) being spaced away from the sidewall of the bush (13).

13. Injection moulding device (1) according to claim 8, the bush being seated in a cavity (21) in the mould body (2) at a distance from the sidewalls of the cavity (21), the bush having a lower shoulder (24), a clamping ring (22) being screwed into the cavity (21) and engaging with the shoulder (22) on the bush, an inner wall (25) of the clamping ring (22) being spaced away from the sidewall of the bush (13).

14. Injection moulding device (1) according to claim 9, the bush being seated in a cavity (21) in the mould body (2) at a distance from the sidewalls of the cavity (21), the bush having a lower shoulder (24), a clamping ring (22) being screwed into the cavity (21) and engaging with the shoulder (22) on the bush, an inner wall (25) of the clamping ring (22) being spaced away from the sidewall of the bush (13).

15. Injection moulding device (1) according to claim 5, wherein the actuator means (15) comprises a cylinder (15) that is placed above the valve pin (11), coaxial therewith, a cylinder housing (30) being detachably coupled to a cooling plate (14) having a cooling channel (18) located below the cylinder (15) and said cooling plate having a bore (47) accommodating the upper end of the bush (13).

16. Injection moulding device (1) according to claim 6, wherein the actuator means (15) comprises a cylinder (15) that is placed above the valve pin (11), coaxial therewith, a cylinder housing (30) being detachably coupled to a cooling plate (14) having a cooling channel (18) located below the cylinder (15) and said cooling plate having a bore (47) accommodating the upper end of the bush (13).

17. Injection moulding device (1) according to claim 7, wherein the actuator means (15) comprises a cylinder (15) that is placed above the valve pin (11), coaxial therewith, a cylinder housing (30) being detachably coupled to a cooling plate (14) having a cooling channel (18) located below the cylinder (15) and said cooling plate having a bore (47) accommodating the upper end of the bush (13).

18. Injection moulding device (1) according to claim 8, wherein the actuator means (15) comprises a cylinder (15) that is placed above the valve pin (11), coaxial therewith, a cylinder housing (30) being detachably coupled to a cooling plate (14) having a cooling channel (18) located below the cylinder (15) and said cooling plate having a bore (47) accommodating the upper end of the bush (13).

19. Injection moulding device (1) according to claim 10, wherein the actuator means (15) comprises a cylinder (15) that is placed above the valve pin (11), coaxial therewith, a cylinder housing (30) being detachably coupled to a cooling plate (14) having a cooling channel (18) located below the cylinder (15) and said cooling plate having a bore (47) accommodating the upper end of the bush (13).

20. Manifold unit (2) for use in an injection moulding device according to claim 5, comprising a central channel, a branching channel (21) with the elongated nozzle (3) connected to the branching channel, the cooling plate (14) being supported on the manifold body (2) via a refractive spacer member (52), a cylinder being placed above the valve pin (11), coaxial therewith, the cylinder housing (30) being coupled to the cooling plate, the cooling plate (14) comprising a cooling channel (18) located below the cylinder (15) and said cooling plate having a bore (47) accommodating the upper end of the bush (13).

* * * * *